(No Model.)
S. E. FOREMAN.
COVER FOR STRAINER PAILS.
No. 380,318. Patented Apr. 3, 1888.
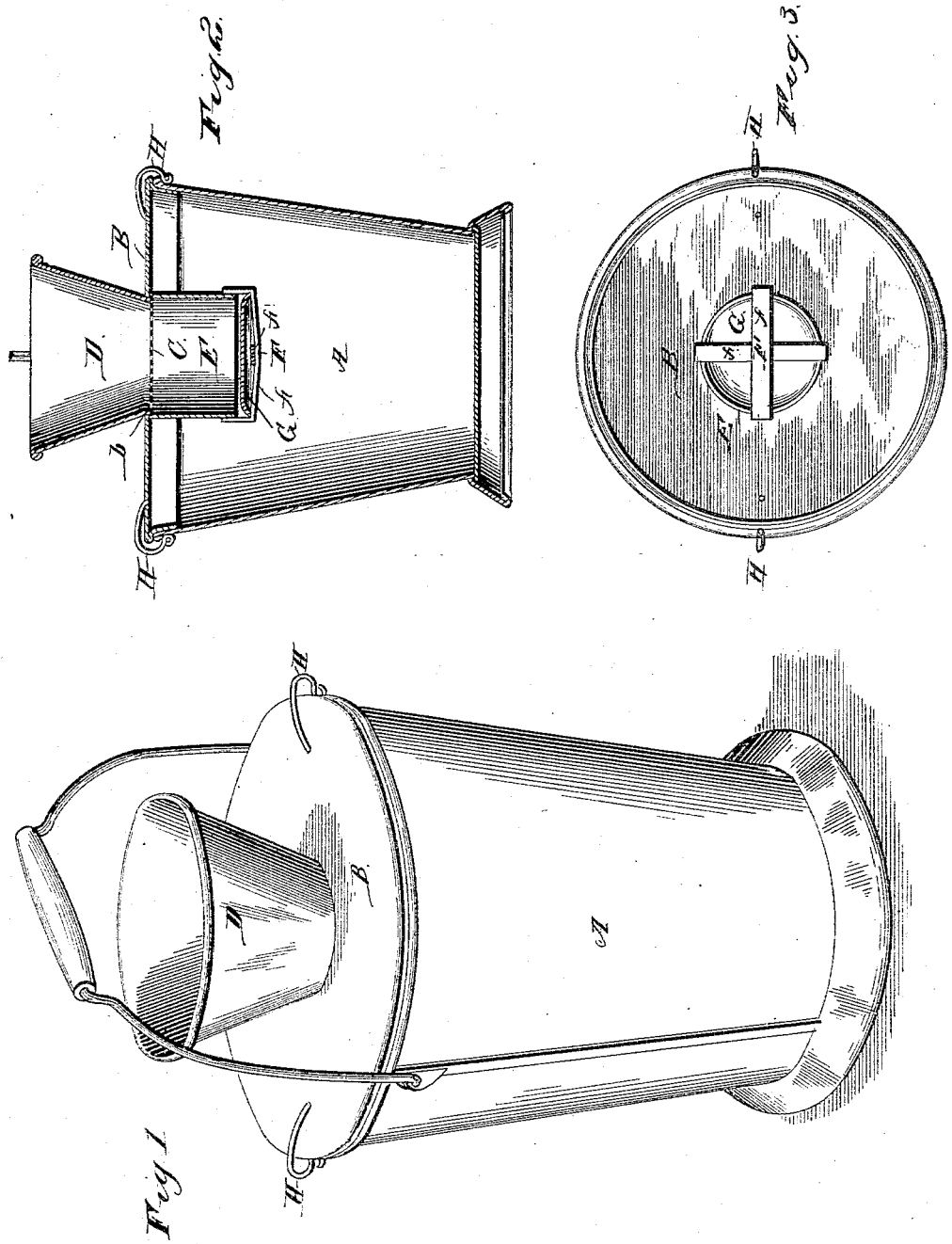

UNITED STATES PATENT OFFICE.

SAMUEL E. FOREMAN, OF RANDOLPH, KANSAS.

COVER FOR STRAINER-PAILS.

SPECIFICATION forming part of Letters Patent No. 380,318, dated April 3, 1888.

Application filed July 15, 1887. Serial No. 244,391. (No model.)

*To all whom it may concern:*

Be it known that I, SAMUEL E. FOREMAN, a citizen of the United States, residing at Randolph, in the county of Riley and State of Kansas, have invented a new and useful Improvement in Covers for Strainer-Pails, of which the following is a specification.

My invention relates to a cover or lid to be applied to pails to prevent the contents of the same from escaping when they are accidentally overturned, while at the same time a liquid may be inserted in the pail while in its upright position.

The device is designed especially for use on milking-pails, and may be applied to either a tin or a wooden bucket, whereby although the milk may be caused to enter the pail while it is upright, should the cow kick the same over, the opening through which the milk has entered will be tightly closed to prevent the escape of the milk.

In the drawings, Figure 1 is a perspective view of a pail provided with my improved cover. Fig. 2 is a vertical central section thereof. Fig. 3 is a bottom plan view of the lid.

Referring by letter to the drawings, A designates the bucket or pail, having a lid, B, of the ordinary shape, provided at the center with an opening, $b$, having a wire screen, C, secured therein.

D is a hopper or flared cup secured to the upper side of the lid, with its lower end registering with the opening $b$, and E is a vertical tube secured to the under side of the lid and aligning with the opening $b$, the lower end of the said tube being provided with a cage, F, comprising the cross-bars $f\ f$. Within the said cage, and below the lower end of the tube E, is the valve G, made in the shape of a saucer, with the convex side thereof up, the outer rounded edge of the same being adapted to fit tightly in the lower end of the tube. The said cage normally holds the valve within a very short distance of the lower end of the tube E— say about an eighth of an inch—and it will be evident that if the pail should be overturned the valve would be held, by the weight of the liquid in the pail, against the lower end of the tube, and thus prevent the escape of the said liquid.

H H designate strong steel spring-clips secured to the lid, and adapted to engage over the upper edge of the pail, to clamp the said lid in place.

The herein-described lid is designed to be applied to a milk-pail, and the milking is done into the upper cup or hopper-shaped receptacle on the top of the lid. The milk is strained through the screen and passes down the tube and into the pail. If during the operation of milking the pail should be overturned, the valve will close the lower end of the said tube and prevent the milk from escaping. Thus I provide a perfect safety-lid for milk-pails, and when desired the lid may be removed and the pail used for other purposes. Moreover, the device is extremely simple and may be very cheaply manufactured.

Having thus described the construction, operation, and advantages of my invention, what I claim, and desire to secure by Letters Patent of the United States, is—

The improved milk-pail composed of the body A, the detachable lid B, the strong springs H, retaining the lid on the body, the funnel D, secured centrally to the lid, the strainer C at the bottom of said funnel, the tube E, secured to and depending from the lid and surrounding the strainer, the cage F, and the saucer-shaped valve G, having its convexity downward.

In testimony that I claim the foregoing as my own I have hereto affixed my signature in presence of two witnesses.

SAMUEL E. FOREMAN.

Witnesses:
 MARION E. IRWIN,
 JAMES H. DOW.